Oct. 30, 1951  G. SANCHEZ  2,573,611
PARALLEL RULE
Filed Jan. 11, 1951  2 SHEETS—SHEET 1
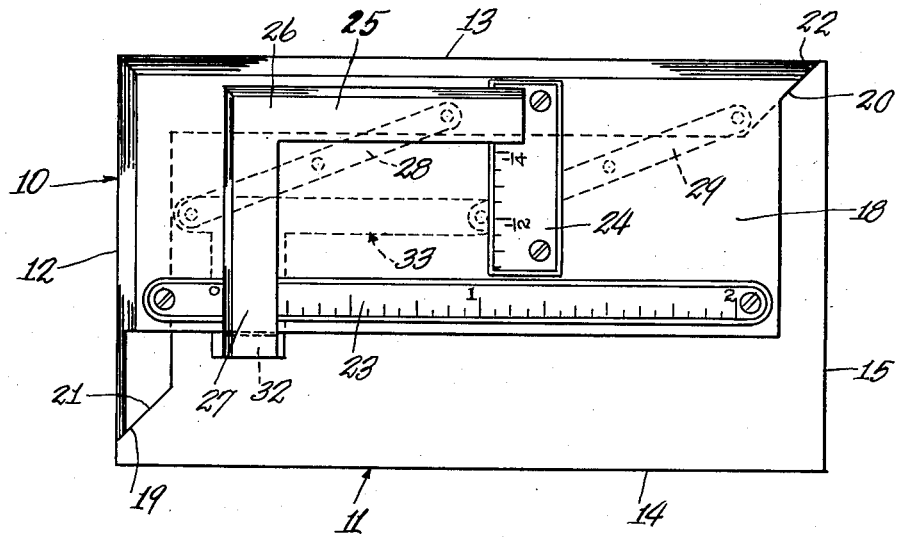
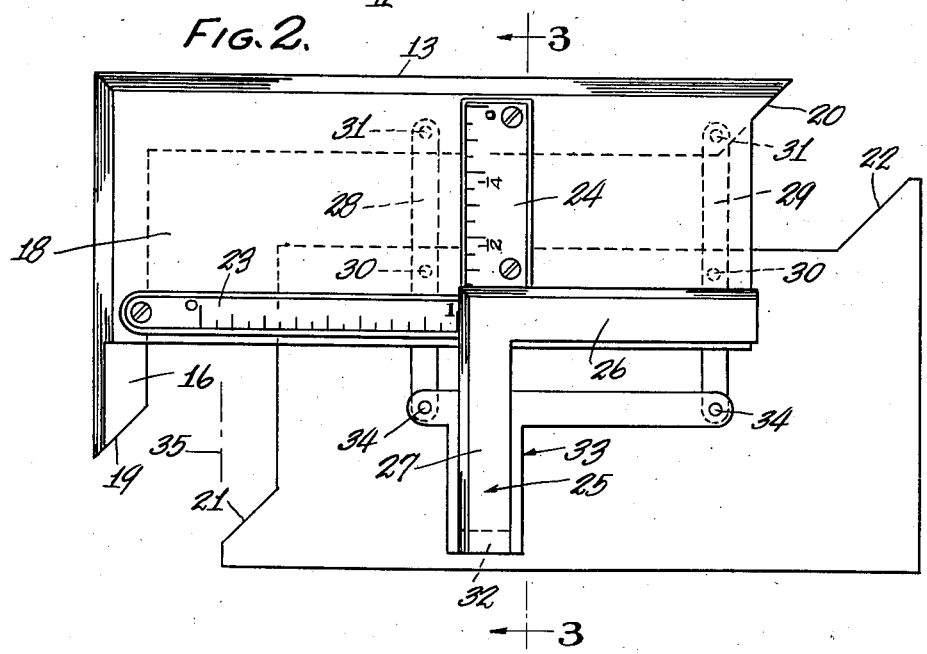
INVENTOR.
GUILLERMO SANCHEZ
BY
ATTORNEY Oct. 30, 1951 G. SANCHEZ 2,573,611
PARALLEL RULE
Filed Jan. 11, 1951 2 SHEETS—SHEET 2
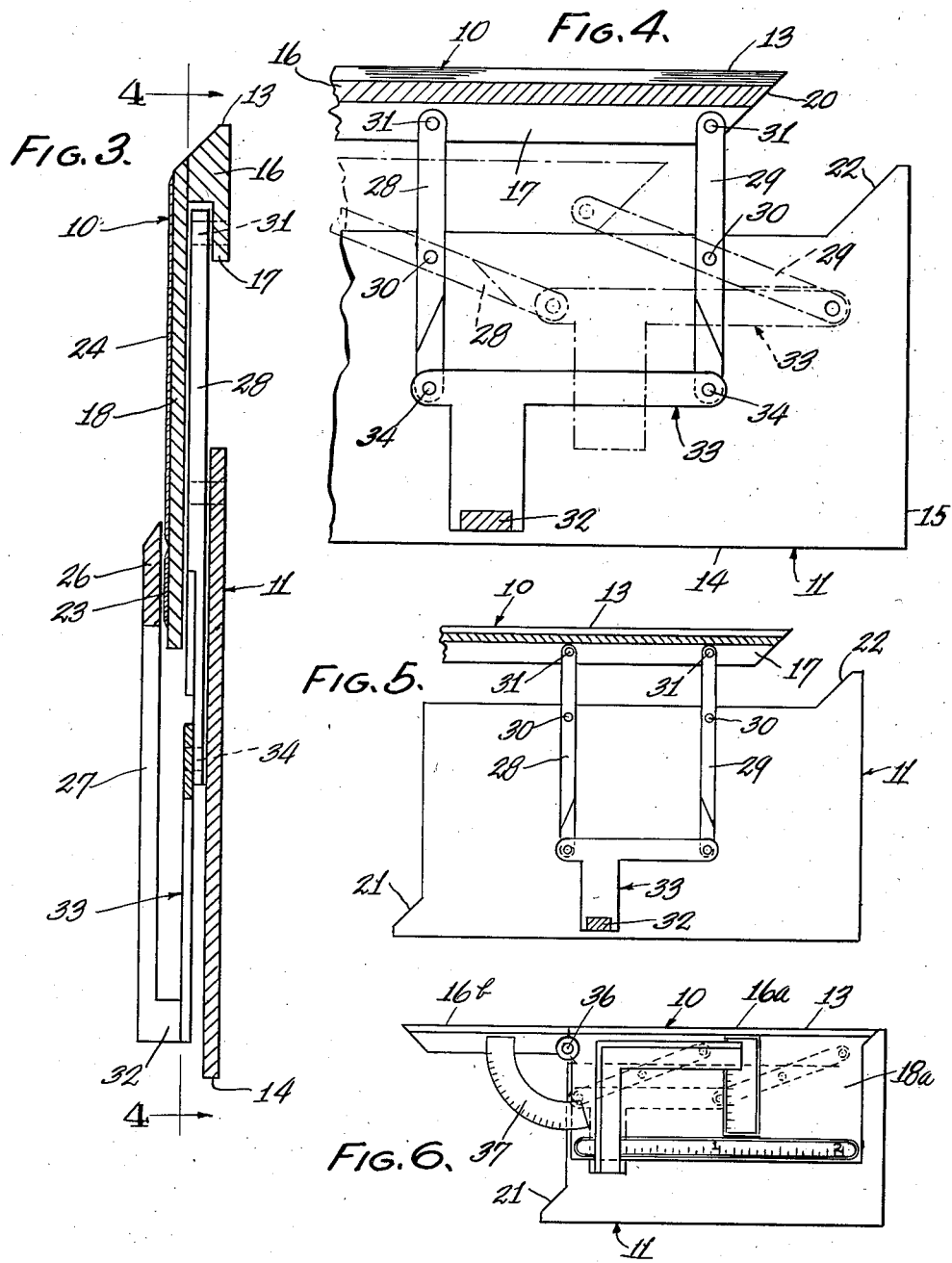
INVENTOR.
GUILLERMO SANCHEZ
BY
*Michael Williams*
ATTORNEY Patented Oct. 30, 1951

2,573,611

UNITED STATES PATENT OFFICE 2,573,611

PARALLEL RULE

Guillermo Sanchez, Warren, Ohio

Application January 11, 1951, Serial No. 205,499

6 Claims. (Cl. 33—108)

My invention relates to parallel rules, particularly to indicating parallel rules, and the principal object of my invention is to provide new and improved rules of such character.

My invention is capable of wide usage, and as examples, it may be used by draftsmen and engineers in drawing parallel lines and in drawing such lines to proportional scales; or it may be used by navigators and others engaged in map making and map interpretation. The invention provides means whereby the distance through which a movable rule is moved in a direction perpendicular to its edge is directly and visibly indicated. By use of suitable scales and link means, the instrument may be applied to the reading and interpretation of maps and charts so that instead of measuring in inches the distance between points or lines may be read directly in terms of feet, yards, miles, or the like. In addition, my invention also provides means for drawing lines at any desired angle with respect to a movable edge and for directly and visibly indicating such angularity.

In the drawings accompanying this specification and forming a part of this application, there is shown, for purposes of illustration, an embodiment which my invention may assume, and in these drawings:

Figure 1 is a plan view of an indicating parallel rule illustrating an embodiment of my invention, Figure 2 is a plan view similar to Figure 1, but with parts in an extended relation, Figure 3 is an enlarged sectional view corresponding generally to the line 3—3 of Figure 2, Figure 4 is a fragmentary sectional view corresponding generally to the line 4—4 of Figure 3, but drawn to a reduced scale, and Figures 5 and 6 are small scale views illustrating the invention in slightly modified forms.

Referring to the drawings, the embodiment of the invention therein disclosed comprises a pair of members 10 and 11 which for convenience may be termed rule members. Each of the rule members has straight edges, and as herein disclosed the member 10 has straight edges 12 and 13 which meet at right angles, each edge being preferably bevelled to facilitate ruling of lines and to provide for accuracy in determining and locating reference points. The member 11 is also formed with straight edges 14 and 15 and these edges also meet at right angles and may or may not be bevelled, as preferred.

The rule members 10 are connected for relative movement in manner that the straight edges of one member relate to the straight edges of the other member and are maintained in parallelism. Thus, referring to the drawings, the straight edges 12 and 15 are related and maintained in parallelism, as are the straight edges 13 and 14. Either of the straight edges 14 and 15 may be maintained at a predetermined reference point, or against the blade of a drafting machine or T-square, and the member 10 may be moved to cause parallel movement of the edges 12 and 13 with respect to the related edges 14 and 15.

The rule member 10 may be formed to comprise a generally L-shaped portion 16 providing the straight edges 12 and 13, such portion having a ledge 17 (see especially Figures 3 and 4) for a purpose to appear later. A generally flat top portion 18 may be secured to the L-shaped portion 16 in any suitable manner. The terminal edges 19 and 20 of the L-shaped portion 16 are bevelled, as best seen in Figure 2, to fit complementary bevelled surfaces 21, 22 of the rule member 11 and thus provide for compact closure of the members upon each other, as seen in Figure 1, to form a generally rectangular figure.

In the present embodiment, the top portion 18 supports a pair of scales 23 and 24 which may be secured thereto in any suitable manner. The scale 23 is positioned to be parallel to the straight edge 13 and thus it will also be maintained in parallelism with the straight edge 14. The scale 24 is positioned to be parallel with the straight edge 12 and thus it will also be maintained in parallelism with the straight edge 15.

Indicator means 25 are provided for movement relative to and in cooperation with the scales 23 and 24 to indicate the amount of movement, either directly or proportionately, between the rule members 10 and 11. The indicator means 25 comprises a pair of legs 26 and 27 which are arranged at right angles to each other, the leg 26 preferably having a bevelled surface cooperable with the measurement indications on the scale 24 and the leg 27 preferably having a bevelled surface cooperable with the measurement indications on the scale 23.

The link means hereinbefore mentioned comprises a pair of spaced-apart links 28 and 29, each having its intermediate portion pivotally carried by the rule member 11, as at 30. Corresponding end portions of the links 28 and 29 are pivotally connected to the ledge 17 of the rule member 10, as at 31. The opposite corresponding end portions of the links 28 and 29 are pivotally connected to the indicator means. In the present embodiment, the leg 27 of the indicator means is provided with an offset portion 32 which is suitably secured to a T-squared member 33, the links 28 and 29 being pivotally connected to spaced portions of a leg of the member 33, as shown at 34.

In the present embodiment, the legs of the links 28, 29, on either side of their respective pivots 30, are of equal length. Accordingly, the leg 27 of the indicator means will travel twice the distance travelled by the edge 12 with respect to its starting point. Thus, the scale 23 may be provided with indications of double scale so as to indicate, for example, movement of the edge 12 a distance of one inch from the starting point (indicated by the line 35 in Figure 2). Because of the disposition of the links 28 and 29 in the embodiment herein disclosed, the edge 13 will move in parallelism with the edge 14 but will not move exactly the same distance as the edge 12, but movement of the edge 13 will be in proportion to movement of the edge 12. Thus, the scale 23 will preferably bear indications which are proportionate to the indications on the scale 23.

It will be appreciated that by varying the length of the legs of each of the links 28, 29 with respect to their pivot point, other proportional movement of the related straight edges with respect to scales may be effected. Thus, in Figure 5, each link is pivotally mounted on the rule member 11 so that one leg is twice the length of the other leg. In such case, the leg 27 of the indicator means will travel three times as far as the edge 12. It will be appreciated that any desired proportional movement may be effected by an appropriate choice of link legs.

The construction disclosed in Figure 6 is in all respects similar to the construction hereinbefore disclosed with the exception that the L-shaped portion 16a is modified to the extent that a leg 16b thereof is pivotally connected to the other leg, as at 36. The top 18a is reduced in size so that the leg 16b may be folded to a right angled position with the other leg of the L-shaped portion. The pivot 36 may include any suitable means for providing sufficient friction so that the leg 16b will yieldably remain in adjusted position. A protractor 37 may be secured in any suitable manner to the top portion 18a of the rule member 10 and in position to cooperate with the movable leg 16b. Thus, parallel lines at any acute angle to the straight edge 13 may be drawn through use of my invention.

From the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. An indicating parallel rule, comprising: a pair of rule members, each having at least one straight edge; scale means carried by one of said rule members; indicator means carried by the other of said rule members for cooperation with said scale means; and link means pivotally carried by one of said rule members and pivotally connected to the other of said rule members and also pivotally connected to said indicator means.

2. An indicating parallel rule, comprising: a pair of rule members, each having at least one straight edge; scale means carried by one of said members; indicator means carried by the other of said members for cooperation with said scale means; and link means for effecting operative connection between said rule members, said link means having an intermediate portion pivotally connected to one of said rule members and corresponding end portions pivotally connected to the other of said rule members, the opposite corresponding end portions being pivotally connected to said indicator means.

3. An indicating rule, comprising: a pair of rule members, each having a pair of adjoining straight edges meeting at right angles; link means connecting said rule members for relative movement and in manner so that the straight edges of one relate to the straight edges of the other and are maintained in parallelism; scale means carried by one of said rule members and comprising legs disposed at right angles to each other, each leg being parallel to a respective one of a related pair of straight edges; and indicator means comprising legs disposed at right angles to each other, each leg being movable over and cooperable with a respective scale means leg.

4. An indicating parallel rule, comprising: a pair of rule members, each having a pair of straight edges; link means connecting said rule members for relative movement and in manner so that the straight edges of one relate to the straight edges of the other and are maintained in parallelism; scale means carried by one of said rule members and comprising a pair of legs, each leg being parallel to a respective one of a related pair of straight edges; and indicator means carried by the other of said rule members and comprising a pair of legs, each leg being cooperable with a respective scale means leg; said link means comprising a pair of spaced links, each link having an intermediate portion pivotally connected to one of said rule members and corresponding end portions pivotally connected to the other of said rule members, the opposite corresponding end portions being pivotally connected to said indicator means.

5. A parallel rule, comprising: a pair of rule members, each having at least one straight-edge-providing portion, one of said straight-edge-providing portions being pivotally connected to its rule member; protractor means carried by the other of said rule members in position for cooperation with said pivotally connected straight-edge-providing portion; and link means connecting said rule members for movement relative to each other and in manner that said straight-edge-providing portion is movable to provide for the drawing of parallel lines.

6. An indicating parallel rule, comprising: a pair of rule members, one having a pair of adjoining straight edges constructed so that they may be shifted to various angular relationship; scale means carried by said one of said rule members; indicator means movable over and cooperable with said scale means; link means pivotally connecting said rule members for movement relative to each other and also being pivotally connected to said indicator means; and protractor means carried by said one of said rule members for cooperation with at least one of said shiftable straight edges.

GUILLERMO SANCHEZ.

REFERENCES CITED

The following references are of record in the file of this patent:

UNITED STATES PATENTS

| Number | Name | Date |
|---|---|---|
| 398,828 | Goss | Mar. 5, 1889 |
| 523,259 | Beeler | July 17, 1894 |